United States Patent

[11] 3,624,099

| [72] | Inventor | Milton Walker Bullock<br>Hopewell, N.J. |
|---|---|---|
| [21] | Appl. No. | 847,392 |
| [22] | Filed | Aug. 4, 1969 |
| [45] | Patented | Nov. 30, 1971 |
| [73] | Assignee | American Cyanamid Company<br>Stamford, Conn.<br>Continuation-in-part of application Ser. No. 669,733, Sept. 22, 1967, now abandoned, which is a division of application Ser. No. 493,231, Oct. 5, 1965, now abandoned. This application Aug. 4, 1969, Ser. No. 847,392 |

[54] PROCESS OF PREPARING 2-IMINO-αPHENYL 3-THIAZOLIDINEETHANOL ACID SALTS
2 Claims, No Drawings

[52] U.S. Cl. .................................................... 260/306.7, 260/454, 424/270

[51] Int. Cl. ........................................................ C07d 91/16
[50] Field of Search ............................................. 260/306.7

[56] References Cited
UNITED STATES PATENTS
2,626,949   1/1953   Gregory ...................... 260/306.7
FOREIGN PATENTS
152,578   10/1950   Australia ..................... 260/306.7

Primary Examiner—Alex Mazel
Assistant Examiner—R. J. Gallagher
Attorney—Ernest Y. Miller ABSTRACT: A method of preparing dl 2-imino-α-phenyl-3-thiazolidineethanol hydrochloride from dl α-phenyl-1-aziridineethanol via the intermediate 2-[(β-hydroxyphenethyl)amino ]ethyl thiocyanate, is described. The products are useful as intermediates in the preparation of the anthelmintic dl 6-phenyl-2,3,5,6-tetrahydroimidazo[2,1-b]thiazole.

PROCESS OF PREPARING 2 -IMINO-αPHENYL 3- THIAZOLIDINEETHANOL ACID SALTS

This application is a continuation-in-part of application Ser. No. 669,733, filed Sept. 22, 1967, now abandoned which in turn is a division of application Ser. No. 493,231, filed Oct. 5, 1965, now abandoned.

SUMMARY OF THE INVENTION

This invention relates to a method of preparing dl 6-phenyl-2,3,5,6-tetrahydroimidazo[2,1-b]thiazole, intermediates and methods of preparing the latter.

The dl 6-phenyl-2,3,5,6tetrahydroimidazo[2,1-b]thiazole prepared by the process of the present invention can be illustrated by the following formulas:

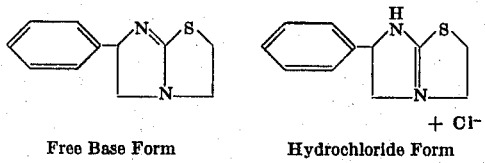

Free Base Form      Hydrochloride Form

The intermediate directly convertible to the products described above is 3-(β-chlorophenethyl)-2-iminothiazolidine hydrochloride. In preparing dl 6-phenyl-2,3,5,6-tetrahydroimidazo[2,1-b]thiazole by the process of the present invention the 3-(β-chlorophenethyl)-2-iminothiazolidine hydrochloride is contacted with a two phase system of an alkaline earth metal hydroxide or carbonate in water and a water immiscible solvent. Solvents such as chloroform, ethylene chloride, ethyl acetate, etc. can be used. The reaction is usually carried out at a temperature range of from about 40° to 120° C. for a period of time of from about 10 minutes to 3 hours depending upon the temperature at which the reaction is carried out. This procedure yields the free base form of the product which is in the water immiscible phase from which it can be obtained by separating the organic phase and evaporating the solvent. The free base so obtained can be transformed into dl 6-phenyl-2,3,5,6-tetrahydroimidazo[2,1-b]thiazole hydrochloride by treatment with hydrogen chloride, preferably isopropanolic hydrogen chloride.

Alternatively the 3-(β-chlorophenethyl)-2-iminothiazolidine hydrochloride can be made to yield the dl 6-phenyl-2,3,5,6-tetrahydroimidazo[2,1-b]thiazole hydrochloride directly. In this process the 3-(β-chlorophenethyl)-2-iminothiazolidine free base is prepared by contacting the hydrochloride with at least 1 molar equivalent of an alkali metal hydroxide or carbonate, preferably in a two phase system made up of water and a water immiscible solvent such as ethyl acetate, chloroform, methylene chloride, ethylene chloride, and the like. The water soluble 3-(β-chlorophenethyl)-2-iminothiazolidine hydrochloride is converted into its free base form by the alkali treatment. The free base passes into the organic phase since it is soluble in the organic solvent and insoluble in water. The conversion of hydrochloride to the free base usually is carried out at ambient temperatures although temperatures between about 0° and 40° C. are operable. The dl 3-(β-chlorophenethyl)-2-iminothiazolidine can be isomerized to dl 6-phenyl-2,3,5,6-tetrahydroimidazo[2,1-b]thiazole hydrochloride by heating a solution of the material in a suitable solvent in the absence of base. Solvents useful for the isomerization are chloroform, ethylene chloride, ethyl acetate and lower alkanols such as methanol, ethanol and isopropanol. When the isomerization is done in a protic solvents dl 6-phenyl-2,3,5,6-tetrahydroimidazo[2,1-b]thiazole hydrochloride usually crystallizes from the reaction mixture and is isolated by filtration.

When it is desired to carry out the isomerization in a protic solvent such as a lower alkanol it is expedient to prepare the dl 3-(β-chlorophenethyl)-2-iminothiazolidine in a low-boiling, water-insoluble solvent such as methylene chloride. Evaporation of the solvent without heating leaves the free base which can be dissolved in the alcohol in the isomerization reaction. The dl 6-phenyl-2,3,5,6-tetrahydroimidazo[2,1-b]thiazole hydrochloride is usually recovered from the alcohol by evaporation of most of the solvent followed by filtration.

The 3-(β-chlorophenethyl)-2-iminothiazolidine hydrochloride is prepared from dl 2-imino-α-phenyl-3-thiazolidine ethanol hydrochloride by reaction with thionyl chloride, phosphorous trichloride or phosphorous oxychloride, all well known to those skilled in the art for transforming alcohols to chlorides. Although excess halogenating agents can be used as a solvent, the reaction is usually carried out by mixing the intermediate with the halogenating agent in a solvent such as methylene chloride, ethylene chloride, or chloroform and heating at a temperature within the range of 40° to 120° C. for 5 minutes to 4 hours.

The dl 2-imino-α-phenyl-3-thiazolidineethanol hydrochloride is prepared by contacting dl α-phenyl-1-aziridineethanol with thiocyanic acid followed by treatment with hydrochloric acid. The thiocyanic acid is usually prepared in situ by the acidification of an ammonium or metal thiocyanate salt. The 2-imino-α-phenyl-3-thiazolidineethanol hydrochloride can also be prepared by reacting α-phenyl-1-aziridneethanol with thiourea and hydrochloric acid followed by heating.

The conversion of dl α-phenyl-1-aziridineethanol to dl 2-imino-α-phenyl-3-thiazolidineethanol is a multistep reaction and obtaining optimum yields of the desired product depend on selecting reaction conditions that suppress undesirable side reactions. A chemical characteristic of aziridine compounds is that they are converted to polymeric materials by acidic reagents. P. E. Fanta, "Heterocyclic Compounds with Three- and Four-membered Rings," Part I, A. Weissberger, Ed., Interscience Publishers, Inc. New York, New York, 1964, p. 557). When a solution of thiocyanic acid is added rapidly to a solution of dl α-phenyl-1-aziridineethanol with cooling to dissipate the heat of the reaction dl 2-[(β-hydroxyphenethyl)amino]ethyl thiocyanate is formed according to step I of this reaction:

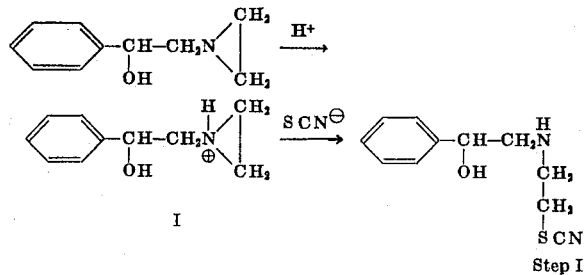

Step I

The product (II) is stable only as the free base or when all in the salt form. When the hydrogen ion concentration is moderately acidic as is solutions of thiocyanic acid or dilute hydrochloric acid the thiocyanate (II) reacts further to form the cation of dl 2-imino-α-phenyl-3-thiazolidineethanol (III) by the reaction sequence shown as step (II) of this reaction.

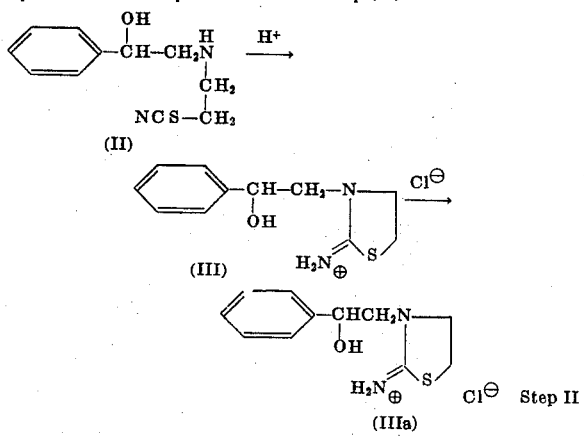

Step II

In summary dl 2-imino-α-phenyl-3-thiazolidineethanol hydrochloride is formed from dl α-phenyl-1-aziridine by protination of the latter to form the salt from (I) which then reacts with thiocyanate anion to yield (II). When (II) is treated with acid it isomerizes to (III) which crystallizes as the chloride salt (IIIa). dl-α-Phenyl-1-aziridine, is like all aziridines, polymerized by acidic materials. It is then advantageous to have the dl α-phenyl-1-aziridine away from acidic material as much as possible. This can be done by adding the starting material to a solution of thiocyanic acid (or a mixture of sodium or potassium thiocyanate and HCl) so that it is instantaneously converted the anion (I) which can react rapidly with thiocyanate anion to form (II). It is important to have an abundance of thiocyanate anion available for (I) to react with. This is easily accomplished by adding simultaneously alcoholic solutions of dl α-phenyl-1-aziridineethanol and of hydrogen chloride to a solution or suspension of sodium or potassium thiocyanate in the alcohols in such a ratio that the proper acid concentration for the desired reactions will be maintained. The optimum conditions for the combined multistep reaction are indicated when the e.m.f. (electromotive force) between a glass electrode and a saturated calomel 325–reads 325– 375 millivolts. Under these conditions not only is (I) rapidly converted to (II) but (II) is converted to (III) which crystallizes as the dl 2-imino-α-phenyl-3-thiazolidine ethanol hydrochloride (IIIa). Due to the exothermic nature of the conversion of (I) to (II) and of (II) to (III) and the heat of crystallization of (IIIa), it is important to operate the process properly so that the heats of the reactions can be dissipated during the time that the reagents are added to avoid a violent reaction from the sudden reaction of an intermediate which has been allowed to accumulate in the reaction mixture. (The reactions are usually carried out at 10° above ambient temperature, however, temperatures between 0° and 100° C. are operable). Although any strong acid could be used as a substitute for hydrogen chloride, it is the acid of choice only because the hydrochloride crystallizes from the reaction mixture leaving impurities in the mother liquor and also is eminently suitable for use in the following step of the synthesis.

The dl α-phenyl-1-aziridineethanol can be prepared by the refluxing styrene oxide in excess ethyleneimine or in a sealed tube reaction as described by Funke, et al., Bull. Soc. Chim. France, 1953 (1,201-3).

The process of the present invention starting with known reactants can be illustrated by the following flow sheet.

FLOWSHEET

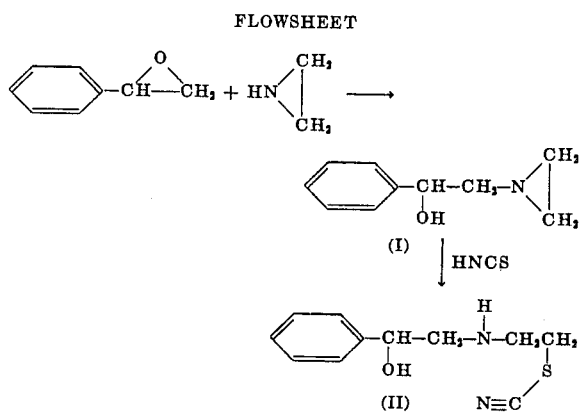

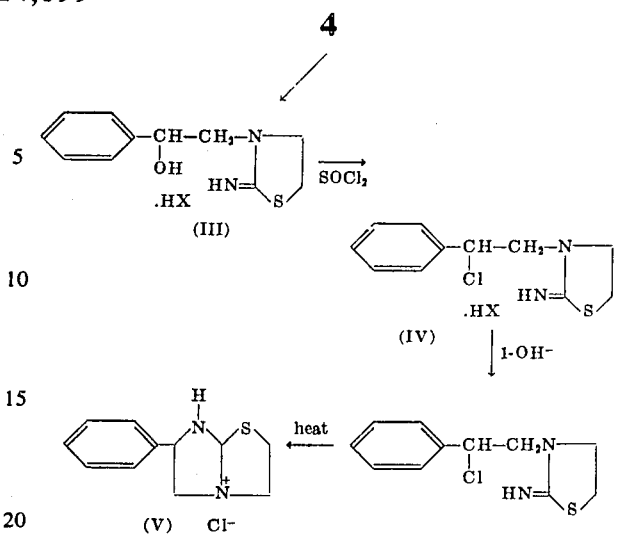

wherein X is a cation.

The preparation of compound (I) in which R is hydrogen has been described by Funke et al. as hereinbefore described. The compounds represented by formula (I) can be transformed into the compounds of (II) by reaction of (I) with thiocyanic acid which can be prepared by the acidification of any ammonium or metal thiocyanate salt. When the compounds of (II) are treated with a strong acid, they are immediately converted to the 2-iminothiazoline compounds of (III). Compounds of (III) can also be prepared by reacting compounds of (I) with thiourea and a strong acid which yields the compounds which can be converted further to (III) by heating in a suitable reaction medium. The compounds of (III) can be converted to the compounds of (IV) by contacting (III) with thionyl chloride or other agents such as phosphorus trichloride which are known to transform alcohols to halides. When the compounds of (IV) are contacted with a base and warmed slightly, it is transformed into the 2,3,5,6-tetrahydroimidazo[2,1-b]thiazole free bases. If desired, the free bases can be converted to salts, which are represented by formula (V), by contacting the free base with an acid and heat.

The compounds of the present invention were tested by standard parasitological procedures for evaluating anthelmintic efficacy, i.e., (1) in most cases the "critical" test in which the number of worms eliminated in the feces following treatment is compared with the total number of worms present, i.e., the sum of those eliminated and those present at necropsy, and (2) the "controlled" test method in which the average numbers of worms present in treated animals is compared at necropsy several days after treatment with the average number present in similarly infected but untreated animals. Depending upon the host species and the particular helminth studied the infections were experimentally induced or in some cases naturally acquired. The tests showed that dl-2,3,5,6-tetrahydro-6-phenyl-imidazo[2,1-b]thiazole hydrochloride and some of its analogs are highly active against a very broad spectrum of nematode parasites of mammals and birds at low dosages, and by varied routes of administration. The following table gives illustrative representative results obtained in testing the above described imidazothiazole, and is not intended to be limiting in regard to dose ranges, routes of administration, or species of nematodes. Data refer to adult helminths unless otherwise indicated.

TABLE

| Host | Doses, mg./kg. (or other) | Route of administration | Approximate percent average efficacy | Species of adult* nematode |
|---|---|---|---|---|
| Mouse | 100 | Oral gavage | 100 | *Syphacia, Aspiculuris.* |
| | 25 | do | 95–100 | *Nematospiroides dubius.* |
| | 20 | Subcutaneous | 80 | Do. |
| | b (0.1%) | Drug-diet | 90 | *Ascaris suum* larvae. |
| | | | 100 | *N. dubius.* |
| Sheep | 3.75–10 | Oral drench | 100 | *Haemonchus contortus.* |
| | 3.75–10 | do | 85–99 | *Nematodirus sp.* |
| | 5–10 | do | 90–100 | *Trichostrongylus axei.* |
| | 10 | do | 94 | *Ostertagia circumcincta.* |
| | 15 | do | 100 | Do. |
| | 7.5–10 | do | 95 | *Trichostrongylus colubriformis* and *T. vitrinus.* |
| | 2.5–7.5 | Subcutaneous | 100 | *H.c.* |
| | 5–7.5 | do | 95 | *O.c.* |
| | 2.5–7.5 | do | 99 | *T.c.* and *T.v.* |
| | 5–7.5 | do | 97–100 | *Nematodirus sp.* |
| | 15 | Oral Drench | 99 | *H.c.* larvae. |
| | 15 | do | 99 | *T.c.* larvae. |
| | 15 | Subcutaneous | 87 | *O.c.* larvae. |
| Cattle | 2.5–10 | Oral Drench | 100 | *Haemonchus placei.* |
| | 7.5–20 | do | 80–100 | *T. axei.* |
| | 7.5–20 | do | 80–100 | *Ostertagi sp.* |
| | 5–10 | do | 100 | *Cooperia sp.* |
| | 7.5 | do | 100 | *Nematodirus sp.* |
| | 5–10 | do | 100 | *Oesophagostomum sp.* |
| | 5–10 | Intramuscular or Subcutaneous | 100 | *H.p.* |
| | 5–20 | do | 90+ | *T. axei.* |
| | 5–20 | do | 90+ | *Ostertagia sp.* |
| | 5–10 | do | 100 | *Cooperia sp.* |
| | 5–10 | Intramuscular | 100 | *Nematodirus sp.* |
| | 5–10 | do | 100 | *Oes. sp.* |
| | 5–10 | do | 100 | *Bunostomum sp.* |
| | 7.5 | Intraperitoneal | 100 | *H.p.* |
| | 7.5 | do | 80 | *T. axei.* |
| | 7.5 | do | 90 | *Ostertagia sp.* |
| | 7.5 | do | 100 | *Cooperia sp.* |
| | 7.5 | do | 100 | *Nematodirus sp.* |
| | 7.5 | do | 100 | *Bunostomum sp.* |
| Swine | 5 | Oral capsule or feed | 100 | *Ascaris suum.* |
| | 10 | In drinking water | 100 | Do. |
| | 2.5–10 | In drinking water or oral capsule | 100 | *Metastrongylus sp.* |
| | 10–20 | In drinking water | 85 | *Oesophagostomum sp.* |
| | b (0.0125%) | In feed continuously | 95 | *Ascaris suum* larvae. |
| Dog | 5 | Subcutaneous | 99 | *Ancylostoma caninum.* |
| | 10 | Oral capsule | 90 | *Toxacara canis.* |
| | 10 | do | 100 | *Toxascaris leonina.* |
| Chicken | 80 | In drinking water | 90+ | *Ascaridia galli* larvae. |

* Unless otherwise indicated. b In feed.

The following examples illustrate in detail the process of preparing substituted imidazothiazoles.

DETAILED DESCRIPTION

Example 1 dl α-Phenyl-1-Aziridineethanol

To a solution of 43.0 grams (1.0 mole) of ethyleneimine and 60.0 grams (0.5 mole) of styrene oxide is added three drops of water and 0.2 grams of potassium hydroxide. The mixture is heated at reflux for 1 ½ hours. Distillation of the crude product gives 55.6 grams (68 percent) of the crystalline product. Recrystallization gives pure α-phenyl-1-ariridineethanol with melting point 74°–76° C.

Example 2 dl α-Phenyl-1-Aziridineethanol

A solution of 60.0 grams (0.5 mole) of styrene oxide, 50 ml. of ethanol, and 0.2 grams of potassium hydroxide is prepared. To this solution is added 25.9 grams (0.6 mole) of ethylenimine in portions. The mixture is maintained at 29°–30° C. for 20 minutes, and then is heated at reflux for 30 minutes. The solvent is removed under reduced pressure to provide the crude product. Addition of petroleum ether to the residue gives 8.5 grams of product with melting point 53°–63° C. Distillation of the remaining oil gives an additional 30.7 grams of product, melting point 56–65° C., the total yield is 48 percent.

Example 3 dl 2-Imino-α-Phenyl-3-Thiazolidineethanol Hydrochloride

To a solution of 1.17 grams (0.012 mole) of potassium thiocyanate in 10 ml. of ethanol is added 0.011 mole of hydrogen chloride in 3 ml. of ethanol. The mixture is warmed to 50° C., cooled, and the precipitated potassium chloride filtered off. The filtrate, which contains 0.011 mole of thiocyanic acid, is added to a solution of 1.63 grams (0.01 mole) of α-phenyl-1-aziridineethanol at a rate sufficient to maintain the reaction temperature at 30°–35° C. After the addition of the thiocyanic acid is complete, the product, dl 2-[(β-hydroxyphenethyl)amino]-ethyl thiocyanate is treated with a solution of 0.015 mole of hydrogen chloride in 5 ml. of ethanol. Removal of the solvent at reduced pressure gives the product, melting point 196°–199° C., in a 95 percent yield. Recrystallization from ethanol provides the pure produce, with melting point 198°–200° C.

Example 4 dl 2-Imino-α-Phenyl-3-Thiazolidineethanol Hydrochloride

The crude product from the reaction of 1.0 mole of ethylenimine with 0.50 mole of styrene oxide is divided into two equal portions. From one a total of 23.95 g. (58 percent) of crystalline α-phenyl-1-aziridineethanol is obtained by vacuum distillation. The other half is reacted with thiocyanic acid without purification.

A warm mixture of 26.7 g. (0.275 mole) of potassium thiocyanate in 250 ml. of ethanol is treated with 53 g. of a methanolic solution of hydrogen chloride (0.25 mole). The precipitated potassium chloride is filtered, and washed with ethanol to provide the thiocyanic acid solution.

To the stirred solution of thiocyanic acid is added a solution of the crude α-phenyl-1-aziridineethanol in 250 ml. of ethanol at a rate sufficient to keep the reaction temperature at 30°–35° C. After the aziridine addition is complete, 72 g. of a methanolic solution of hydrogen chloride (0.35 mole) is added and the solution stirred for 1.5 hours at room temperature. An additional 0.05 mole of hydrogen chloride in 10 g. of ethanol is added, and the reaction heated at 35°–40° C. for 0.5 hour. It is then allowed to proceed at room temperature for 2.5 days. Essentially no change is evident (by infrared) from the further reaction at room temperature, but crystallization of the product does occur. The mixture is concentrated at reduced pressure to ca. 100 ml., filtered, washed with ethanol and dried to give 27.1 g. of white crystals, melting point 198°–200° C. The yield is 42 percent (based on styrene oxide) or 71 percent (based on dl α-phenyl-1 aziridineethanol).

Example 5 dl 2-Imino-α-Phenyl-3-Thiazolidineethanol Hydrochloride

To a solution of 87.2 g. (1.1 mole) of sodium thiocyanate in 1,700 ml. of isopropanol is added 163.2 g. (1.0 mole) of α-phenyl-1-aziridineethanol in 700 ml. of isopropanol and 163 ml. of 12 N hydrochloric acid during 0.5 hr., while maintaining the e.m.f. (electromotive force) of about 325–375 millivolts between a glass electrode and a saturated calomel cell. After an additional 20 min., 20 ml. of 12N hydrochloric acid (total of 2.2 moles) is added. The mixture is filtered and air dried to give 269 g. of sodium chloride and product. Concentration of the filtrate gives 68.8 g., melting point 199°–201° C. of the pure crystalline product. The salt contaminated product is treated with 150 ml. of water, filtered, washed with ether and dried to give 109.1 g. of product, melting point 203°–205° C. A total of 177.9 (69 percent, based on azindine) of product is obtained.

Example 6 dl 3-(β-Chlorophenethyl)-2-Iminothiazolidine Hydrochloride

To a solution of 2.25 grams (0.009 mole) of 2-imino-α-phenyl-3-thiazolidineethanol hydrochloride in 50 ml. of chloroform is added 3 ml. of thionyl chloride. The mixture is refluxed for 30 minutes, and the solvent removed under pressure to give 1.93 grams of solid product.

Example 7 dl 6-Phenyl-2,3,5,6-Tetrahydroimidazo[2,1-b]Thiazole

To a solution of 1.30 grams (0.005 mole) of 3-(β-chlorophenethyl)-2-iminothiazolidine hydrochloride in 50 ml. of chloroform is added a solution of 2.76 grams of potassium carbonate in 10 ml. of water. The mixture is heated at reflux for 1 hour, cooled, and the layers separated. The organic layer is washed with water and dried over potassium carbonate. Removal of the solvent under reduced pressure gives 1.0 grams of impure solid. Crystallization from ether gives the pure product, melting point 90°–92° C.

Example 8 dl 6-Phenyl-2,3,5,6-Tetrahydroimidazo[2,1-b]Thiazolium Chloride

To a solution of 6-phenyl-2,3,5,6tetrahydroimidazo[2,1-b]thiazole in isopropanol is added a solution of hydrogen chloride in isopropanol. The precipitated hydrochloride is filtered, and washed consecutively with ethanol and ether. The crystalline product has melting point 261°–262° C. with decomposition.

Example 9 dl 2-Imino-α-Phenyl-3-Thiazolidineethanol Hydrochloride

When α-phenyl-1-azirindineethanol is mixed with a stoichiometric quantity of thiourea in the presence of hydrochloric acid the product obtained is dl 2{2[((β-hydroxyphenyl-ethyl)amino]ethyl}-2-thiopseudourea. The latter product on heating produces the product.

Example 10 dl 2-Phenyl-2,3,5,6-Tetrahydroimidazo[2,1-b]Thiazolium Chloride

One gram (0.036 mole) of 3-(β-chlorophenethyl)-2-iminothiazolidine hydrochloride is partitioned between 50 ml. of ethylacetate and a solution of 2.34 g. (0.017 moles) of potassium carbonate in 32 ml. of water. The ethylacetate layer is separated and heated at reflux temperature for 2½ hours. The precipitate of 6-phenyl-2,3,5,6-tetrahydroimidazo[2,1-b]thiazolium chloride is collected by filtration and recrystalized from absolute ethanol to yield 0.3 g. of pure product, melting point 257°–259° C.

I claim:

1. A method of producing dl 2-imino-α-phenyl-3-thiazolidine ethanol hydrochloride comprising the simultaneous addition of dl α-phenyl-1-aziridineethanol and a lower alkanols solution of hydrogen chloride to at least 1 molar equivalent of a compound selected from the group consisting of sodium thiocyanate and potassium thiocyanate in a ratio that the acidity of the reaction mixture remains between about 325 and 375 millivolts as measured between a glass hydrogen ion electrode and a saturated calomel cell reference electrode.

2. A method of producing dl 2-imino-α-phenyl-3-thiazolidineethanol hydrochloride comprising the simultaneous addition of dl α-phenyl-1-aziridineethanol and an isopropanol solution of hydrogen chloride to at least 1 molar equivalent of a compound selected from the group consisting of sodium thiocyanate and potassium thiocyanate in a ratio that the acidity of the reaction mixture remains between about 325 and 375 millivolts as measured between a glass hydrogen ion electrode and a saturated calomel cell reference electrode.

* * * * *